United States Patent
Hayashi (10) Patent No.: US 7,145,705 B2
(45) Date of Patent: Dec. 5, 2006

(54) OPTICAL SCANNER AND IMAGE FORMING APPARATUS

(75) Inventor: Yoshinori Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/942,825

(22) Filed: Sep. 17, 2004

(65) Prior Publication Data

US 2005/0099663 A1    May 12, 2005

(30) Foreign Application Priority Data

Sep. 19, 2003    (JP)    ............................. 2003-328941

(51) Int. Cl.
*G02B 26/08*    (2006.01)
(52) U.S. Cl. ..................................... 359/204
(58) Field of Classification Search ................ 359/204, 359/216–218
See application file for complete search history.

(56) References Cited

U.S. PATENT DOCUMENTS

| | | | |
|---|---|---|---|
| 5,359,407 A * | 10/1994 | Suzuki et al. | 356/237.2 |
| 5,557,448 A | 9/1996 | Endo et al. | |
| 5,570,224 A | 10/1996 | Endo et al. | |
| 5,581,392 A | 12/1996 | Hayashi | |
| 5,652,670 A | 7/1997 | Hayashi | |
| 5,875,051 A | 2/1999 | Suzuki et al. | |
| 5,986,791 A | 11/1999 | Suzuki et al. | |
| 6,069,724 A | 5/2000 | Hayashi et al. | |
| 6,081,386 A | 6/2000 | Hayashi et al. | |
| 6,104,522 A | 8/2000 | Hayashi et al. | |
| 6,141,133 A | 10/2000 | Suzuki et al. | |
| 6,185,026 B1 | 2/2001 | Hayashi et al. | |
| 6,198,562 B1 | 3/2001 | Hayashi et al. | |
| 6,222,662 B1 | 4/2001 | Suzuki et al. | |
| 6,229,638 B1 | 5/2001 | Sakai et al. | |
| 6,229,656 B1 * | 5/2001 | Omura | 359/796 |
| 6,317,246 B1 | 11/2001 | Hayashi et al. | |
| 6,369,927 B1 | 4/2002 | Hayashi | |
| 6,400,391 B1 | 6/2002 | Suhara et al. | |
| 6,445,482 B1 | 9/2002 | Hayashi | |
| 6,462,853 B1 | 10/2002 | Hayashi | |
| 6,563,624 B1 * | 5/2003 | Ishihara | 359/205 |
| 6,573,921 B1 | 6/2003 | Hayashi | |
| 6,587,245 B1 | 7/2003 | Hayashi | |
| 6,657,765 B1 | 12/2003 | Hayashi et al. | |
| 6,704,129 B1 | 3/2004 | Sakai et al. | |
| 2002/0105707 A1 | 8/2002 | Hayashi | |
| 2004/0100674 A1 | 5/2004 | Sakai et al. | |

FOREIGN PATENT DOCUMENTS

JP    2002-23085    1/2002

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

A scanner which optically scans n positions, where n≧2, has m light sources which emits p beams, where 1≦m<n and p≦1; a unit which splits each beam into q beams in a sub-scanning direction and forms each beam into a predetermined form, where 2≦q≦n; a deflector having a plurality of planes around a rotation axis and configured to deflect a number of beams equal to (q·m·p) from the m sources which are incident on the deflector; n optical systems which guide n sets of beams deflected to corresponding positions to form light spots; and a selecting unit which selects a path for each of the n sets of beams, wherein the deflector is at least a part of the selecting unit.

14 Claims, 6 Drawing Sheets

OPTICAL SCANNER AND IMAGE FORMING APPARATUS

CROSS-REFERENCE TO RELATED APPLICATIONS

The present document incorporates by reference the entire contents of Japanese priority document, 2003-328941 filed in Japan on Sep. 19, 2003.

BACKGROUND OF THE INVENTION

1) Field of the Invention

The present invention relates to an optical scanner and an image forming apparatus, and particularly to an optical scanner and an image forming apparatus that are utilized for optical printer, digital copying machine, plain-paper facsimile, and the like.

2) Description of the Related Art

In an image forming apparatus utilizing an electrophotographic process used in optical printer, digital copying machine, plain-paper facsimile, and the like, the colorization and faster printing have become common, and a tandem type image forming apparatus using a plurality of photoconductors is becoming widespread. In the tandem type image forming apparatus, a larger number of light sources are utilized and consequently the number of components for the apparatus is increased, and this results in a cost increase for the apparatus. In the image forming apparatus, failure of light sources can be cited as the main cause for malfunctions of units that perform optical scanning, and as the number of light sources is increased, a probability of malfunctions becomes higher.

The present inventor has proposed a tandem type image forming apparatus with a reduced number of light sources as disclosed in the Japanese Patent Application Laid-open No. 2002-23085.

In the image forming apparatus described in the patent application, optical scanning paths from one light source toward two photoconductors are formed, the optical scanning paths toward the two photoconductors are sequentially selected with a time lag, and the light beams from one light source are intensity-modulated with image signals corresponding to an optical scanning position optically scanned by the selected optical scanning path, thereby the two photoconductors are optically scanned with light beams from one light source.

Accordingly, since the two photoconductors can be optically scanned with one light source, only two light sources are required even in the tandem type image forming apparatus using four photoconductors.

However, in an embodiment specifically described in the patent application, there is a limitation to speeding-up of image formation because single optical scanning on two photoconductors is performed with the light beams from one light source by one rotation of a optical deflector.

SUMMARY OF THE INVENTION

It is an object of the present invention to solve at least the problems in the conventional technology.

An optical scanner according to an aspect of the present invention is configured to optically scan n optical scanning positions with a light beam from a light source by forming optical scanning paths from the light source to the n optical scanning positions, where $n \geq 2$, sequentially selecting the optical scanning paths at different timings, and performing intensity modulation of the light beam from the light source with image signals corresponding to the optical scanning positions optically scanned via the optical scanning path selected, the optical scanner comprising: m light sources configured to emit p light beams, where $1 \leq m < n$ and $p \geq 1$; a light beam splitting unit configured to split each of the light beams from each of the light sources into q light beams in a sub-scanning direction and to form each of the light beams into a predetermined beam form, where $2 \leq q \leq n$; a polygon mirror type optical deflector including a plurality of deflection-reflection planes around a rotation axis and configured to deflect a number of light beams equal to $(q \cdot m \cdot p)$ from the m light sources which are incident on the polygon mirror type optical deflector; n scanning imaging optical systems configured to guide n sets of light beams deflected by the polygon mirror type optical deflector to corresponding optical scanning positions to form light spots; and an optical path selecting unit configured to select an optical scanning path for each of the n sets of light beams, wherein the polygon mirror type optical deflector is at least a part of the optical path selecting unit configured to select an optical scanning path for each of the n sets of light beams, wherein the polygon mirror type optical deflector is at least a part of the optical path selecting unit.

A tandem type image forming apparatus according to another aspect of the present invention, in which optical scanning is performed on a plurality of photoconductors with an optical scanner according to the above aspect so as to individually form electrostatic latent images, the electrostatic latent images are visualized to form toner images, and the toner images are transferred onto a same sheet recording medium to synthetically perform image formation.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail below with reference to the accompanying drawings.

Figure 1:
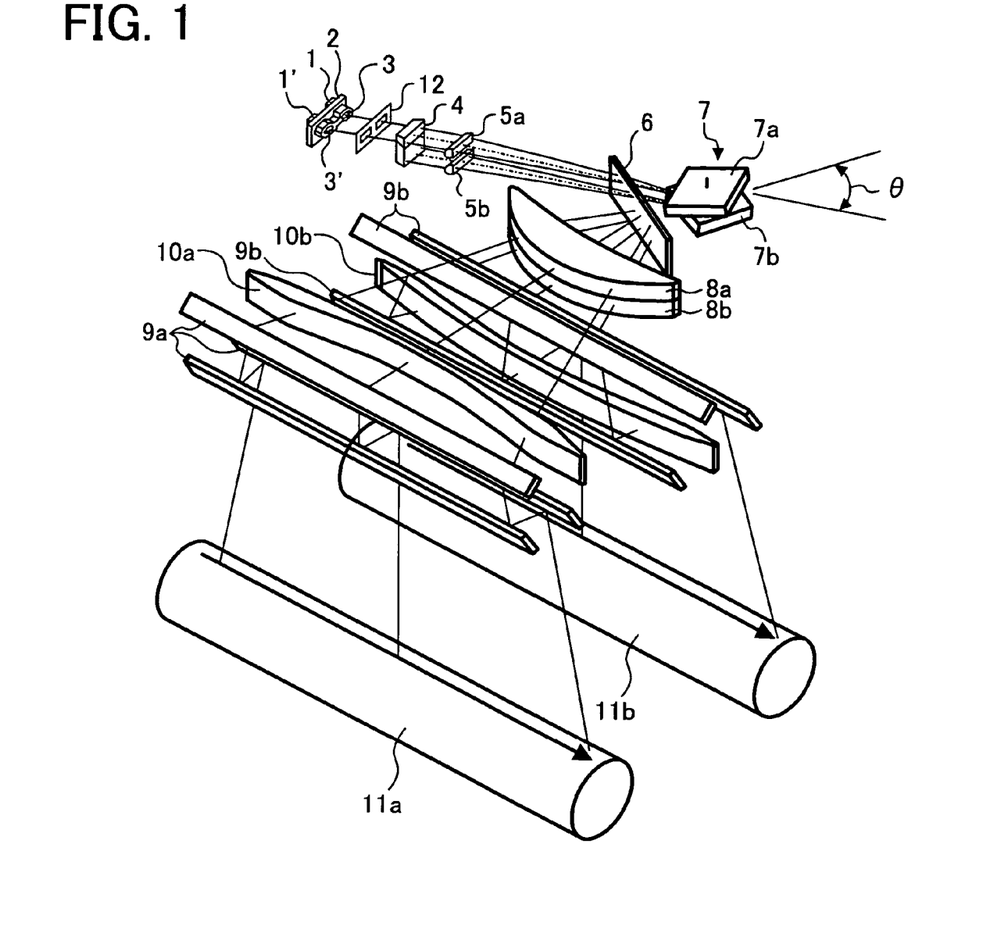
FIG. 1 is a view for explaining one embodiment of an optical scanner.

FIG. 1 is a view for explaining an embodiment of the optical scanner according to the invention. In FIG. 1, reference signs 1 and 1' represent semiconductor lasers. The semiconductor lasers 1 and 1' are two light-emission sources constituting one light source, and each of the semiconductor lasers emits one light beam. The semiconductor lasers 1 and 1' are held in a predetermined positional relationship by a holder 2.

Each of the light beams emitted from the semiconductor lasers 1 and 1' is converted into a luminous flux form (parallel luminous flux or luminous flux with weak divergence or with weak convergence) suitable for subsequent optical systems by coupling lenses 3 and 3'. In this example, the light beams coupled by the coupling lenses 3 and 3' are parallel luminous flux.

Each light beam outgoing from the coupling lens to become a desired luminous flux form is beam-shaped by passing through an opening of an aperture 12 that restricts a light beam width, each light beam then enters a half mirror prism 4, and is split into two light beams in a sub-scanning direction by an operation of the half mirror prism.

Figure 2:
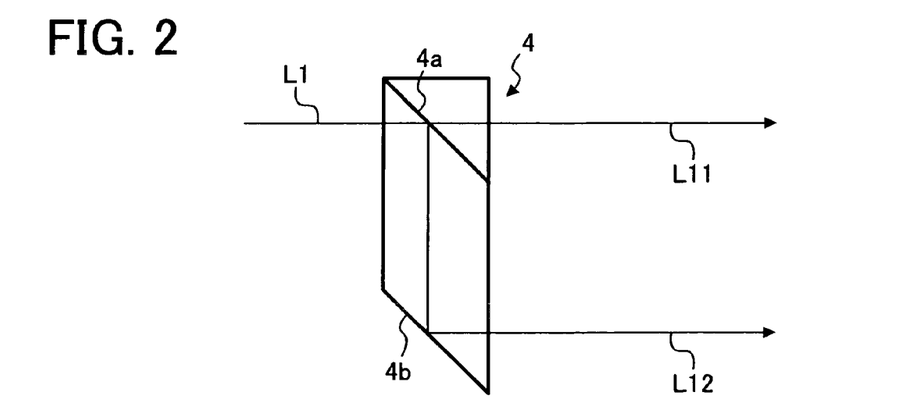
FIG. 2 is a view for explaining an operation of a half mirror prism in FIG. 1.

FIG. 2 depicts the state that the light beam being split into two light beams. For simplicity of the drawing, only a light beam L1 emitted from the semiconductor laser 1 is shown in FIG. 2. The vertical direction of FIG. 2 is the sub-scanning direction, and the half mirror prism 4 has a semitransparent mirror 4a and a reflecting plane 4b that are parallel to each other in the sub-scanning direction. The light beam L1 enters the half mirror prism 4, and then enters the semitransparent mirror 4a. A part of the incident light beam is transmitted straight through the semitransparent mirror 4a to become a light beam L11. The remaining part of the light beam is reflected from the semitransparent mirror 4a to enter the reflecting plane 4b, and is totally reflected from the reflecting plane 4b to become a light beam L12.

In this example, since the semitransparent mirror 4a and the reflecting plane 4b are also parallel to each other, the light beams L11 and L12 outgoing from the half mirror prism 4 are also parallel to each other. Thus, the light beam from the semiconductor laser 1 is split into the two light beams L11 and L12 in the sub-scanning direction. The light beam from the semiconductor 1' is split into two in a similar manner.

Accordingly, the two light beams are emitted from one light source (m=1) and each of the two light beams is further split in the sub-scanning direction into two light beams (q=2). As a result, the four light beams are obtained.

Returning to FIG. 1, the four light beams are incident to cylindrical lenses 5a and 5b. The four light beams are focused into the sub-scanning direction by the operation of the cylindrical lenses 5a and 5b and imaged as a long line image in a main scanning direction near a deflection reflection plane of a polygon mirror type optical deflector 7.

As shown in FIG. 1, among the light beams emitted from the semiconductor lasers 1 and 1' and split by the half mirror prism 2, the light beam (light beam L11 shown in FIG. 2) transmitted straight through the semitransparent mirror 4a of the half mirror prism 4 enters the cylindrical lens 5a, and the light beam (light beam L12 shown in FIG. 2), which is reflected from the semitransparent mirror 4a and further reflected from the reflecting plane 4b, enters the cylindrical lens 5b.

In FIG. 1, a reference sign 6 represents sound-proof glass that is provided in a window of a sound-proof housing of the polygon mirror type optical deflector 7. The four light beams from the light source side enter the polygon mirror type optical deflector 7 through the sound-proof glass 6, and deflected light beams are emitted through the sound-proof glass 6 toward a scanning imaging optical system side.

In the polygon mirror type optical deflector 7, an upper polygon mirror 7a and a lower polygon mirror 7b are integrally formed in two stages in the direction of a rotation axis. The polygon mirror type optical deflector 7 is rotated around the rotation axis by a drive motor (not shown).

In this example, the upper polygon mirror 7a and the lower polygon mirror 7b have an identical shape and both include four deflection reflection planes, and the deflection reflection plane of the lower polygon mirror 7b is shifted in a rotation direction by a predetermined angle θ (=45°) relative to the deflection reflection plane of the upper polygon mirror 7a. The upper polygon mirror 7a and the lower polygon mirror 7b may be integrally formed.

In FIG. 1, reference signs 8a and 8b represent a first scanning lens, reference signs 10a and 10b represent a second scanning lens, reference signs 9a and 9b represent an optical path folding mirror, and reference signs 11a and 11b represent a photoconductor.

The first scanning lens 8a, the second scanning lens 10a, and the optical path folding mirror 9a constitute a set of scanning imaging optical system that guides the two light beams deflected by the upper polygon mirror 7a of the polygon mirror type optical deflector 7 (two light beams emitted from the semiconductor lasers 1 and 1' and transmitted through the semitransparent mirror 4a of the half mirror prism 4) onto the photoconductor 11a, at a corresponding optical scanning position, to form two light spots that are separated from each other in the sub-scanning direction.

The first scanning lens 8b, the second scanning lens 10b, and the optical path folding mirror 9b constitute a set of scanning imaging optical system that guides the two light beams deflected by the lower polygon mirror 7b of the polygon mirror type optical deflector 7 (two light beams emitted from the semiconductor lasers 1 and 1' and transmitted through the semitransparent mirror 4a of the half mirror prism 4) onto the photoconductor 11b, at a corresponding optical scanning position, to form two light spots that are separated from each other in the sub-scanning direction.

For the light beams emitted from the semiconductor laser 1 and 1', an optical arrangement is set as principal rays to intersect near a position of the deflection reflection plane viewed from the rotation axis direction of the polygon mirror type optical deflector 7. Accordingly, in each pair of two luminous fluxes enter the deflection reflection plane, the light beams both have an open angle (an angle formed by projections to the plane orthogonal to the rotation axis of the two light beams when the light source side is viewed from the deflection reflection plane side).

The two light spots formed on each of the photoconductors 11a and 11b are also separated from each other in the main scanning direction by the open angle. Therefore, the two light beams optically scanning on each photoconductor can be individually detected to synchronize a start of the optical scanning in each light beam.

Accordingly, the multi-beam scanning is performed on the photoconductor 11a by the two light beam deflected by the upper polygon mirror 7a of the polygon mirror type optical deflector 7, and the multi-beam scanning is performed on the photoconductor 11b by the two light beam deflected by the lower polygon mirror 7b of the polygon mirror type optical deflector 7.

Since the deflection reflection planes of the upper polygon mirror 7a and of the lower polygon mirror 7b of the polygon mirror type optical deflector 7 are shifted by 45° from each other, the light beams deflected by the lower polygon mirror 7b are not guided to the photoconductor 11b when the light beams deflected by the upper polygon mirror 7a optically scan the photoconductor 11a, and the light beams deflected by the upper polygon mirror 7a are not guided to the photoconductor 11a when the light beams deflected by the lower polygon mirror 7b optically scan the photoconductor 11b.

Figure 3A:
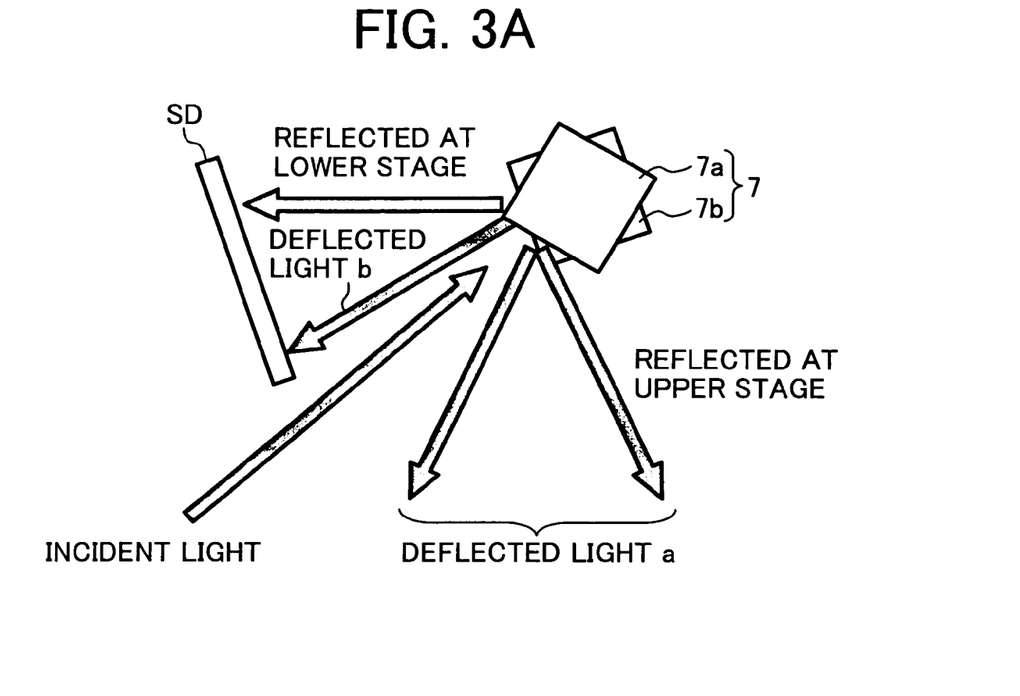
FIG. 3A is a view for explaining a function of a polygon mirror type optical deflector in FIG. 1.
Figure 3B:
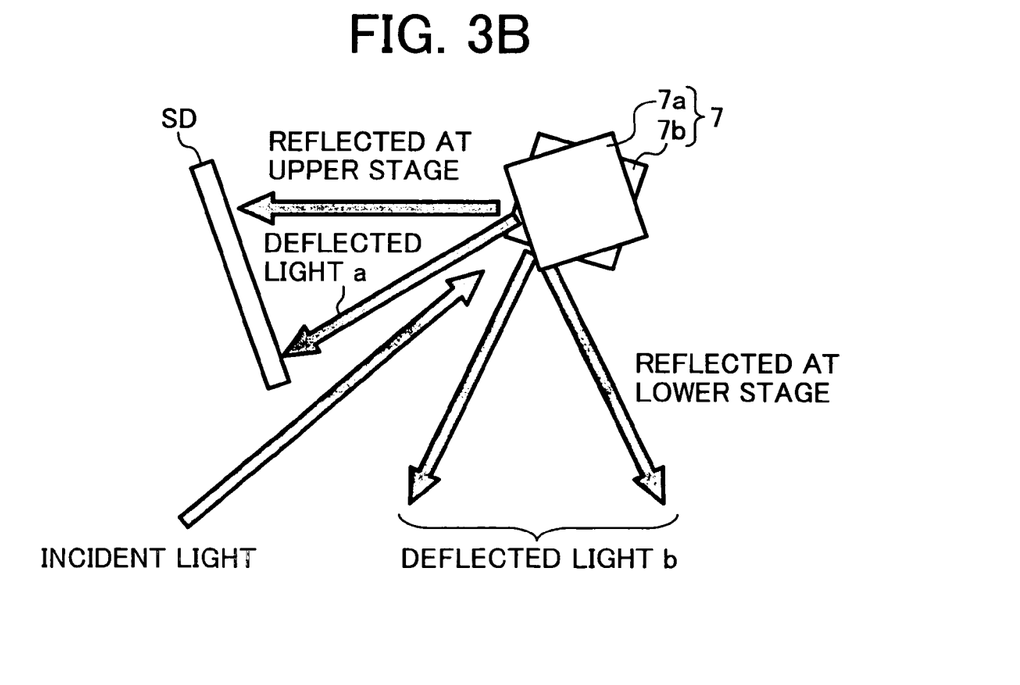
FIG. 3B is a view for explaining the function of the polygon mirror type optical deflector in FIG. 1.

Namely, the optical scanning on the photoconductors 11a and 11b are alternately performed with a time lag. FIGS. 3A and 3B are views for explaining this state. For simplicity of the explanation, a light beam (in practice, four light beams) entering the polygon mirror type optical deflector 7 is shown as an incident light and light beams to be deflected are shown as a deflected light "a" and a deflected light "b".

FIG. 3A depicts the state that the incident light enters the polygon mirror type optical deflector 7 and the deflected light "a" reflected and deflected by the upper polygon mirror 7a is guided to the optical scanning position. At this point, the deflected light "b" deflected by the lower polygon mirror 7b is not guided to the optical scanning position. FIG. 3B depicts the state that the deflected light "b" reflected and deflected by the lower polygon mirror 7b is guided to the optical scanning position. At this point, the deflected light "a" deflected by the upper polygon mirror 7a is not guided to the optical scanning position.

As shown in FIG. 3, it is preferable to use a proper light shielding unit SD to block the deflected light that is not guided to the optical scanning position in order that the deflected light by one of the polygon mirrors does not act as a ghost light while the deflected light by the other polygon mirror is guided to the optical scanning position. In practice, this can be easily achieved by having an inner wall of the sound-proof housing to be irreflexive.

As described above, in the embodiment shown in FIG. 1, the optical scanning (of a multi-beam system) of the photoconductors 11a and 11b are alternately performed. Therefore, for example, an electrostatic latent image of a black image can be written in the photoconductor 11a when light intensity of the light source is modulated by image signals of the black image in performing the optical scanning on the photoconductor 11a, and an electrostatic latent image of a magenta image can be written in the photoconductor 11b when the light intensity of the light source is modulated by the image signals of the magenta image in performing the optical scanning on the photoconductor 11b.

Figure 4:
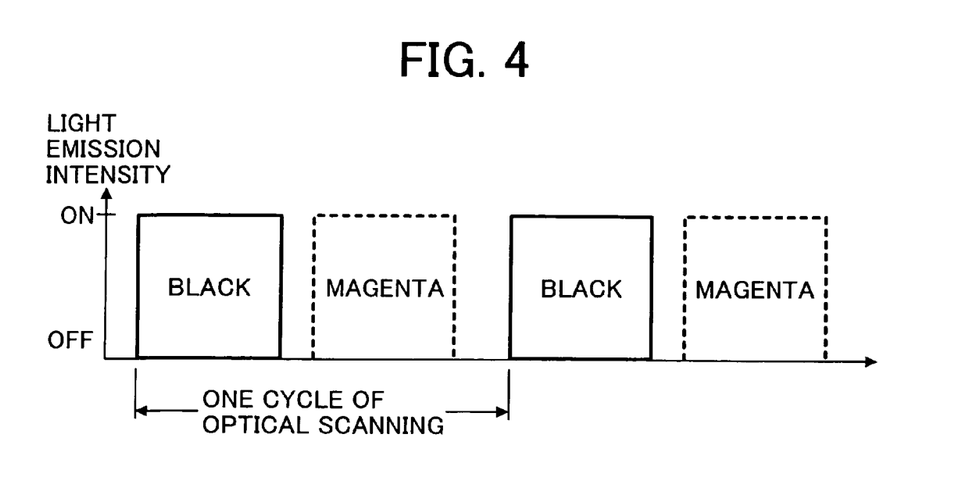
FIG. 4 is a view for explaining an intensity modulation of a light source when black and magenta images are written in an embodiment of FIG. 1.

FIG. 4 is a timing chart in the case of full-lighting in an effective scanning area when the black image and the magenta image are written with the common light source (semiconductor lasers 1 and 1' of FIG. 1). The solid line in FIG. 4 indicates a portion corresponding to the write of the black image, and the broken line indicates a portion corresponding to the write of the magenta image. As described above, the timing of starting to write the black image and the magenta image is determined by detecting the light beam toward the optical scanning position with a synchronized light-reception unit (not shown in FIG. 1, usually the unit is a photodiode) arranged outside the effective scanning area.

Figure 5:
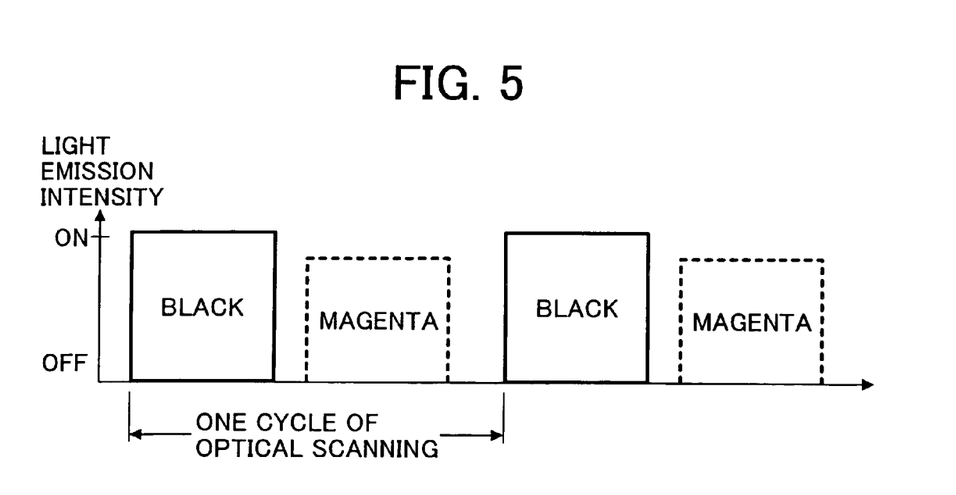
FIG. 5 is a view for explaining an example in which light emission intensity values of the light source are different from each other when the black and the magenta images are written by the intensity modulation of FIG. 4.

In FIG. 4, light emission intensity of the light source in the writing time area of the black image is set to the same value as that of the magenta image. When there is a relative difference in transmittance or reflectance of the optical element in each optical path from the light source to the photoconductor 11a or 11b, and the photoconductors 11a and 11b are equal to each other in the light emission intensity of the light source, light volumes of the light beams reaching the photoconductors become different from each other. In this case, as shown in FIG. 5, the light volumes of the light beams reaching each photoconductor can be equalized by having the light emission intensity value of one of light sources differed from the value of the other light source when the light beams optically scan different photoconductors.

Instead of setting the light emission intensity in the light source to the different value for each photoconductor, for example, the light volumes of the light beams reaching photoconductors may be equalized by setting a ratio of transmittance to reflectance of the semitransparent mirror 4a of the half mirror prism 4 not to be 1 to 1, but by adjusting the ratio of transmittance to reflectance. In order to equalize the light volumes reaching different photoconductors, making light intensity values in the light sources different and adjusting the ratio of the transmittance to the reflectance of the semitransparent mirror 4a of the half mirror prism 4 may be combined.

The embodiment with reference to FIGS. 1 to 4 is an optical scanner in which an optical scanning paths from one light source toward n (n=2) optical scanning positions are formed, the optical scanning paths toward the n optical scanning positions are sequentially selected with a time lag, and by an intensity modulation of light beams from one light source with image signals corresponding to the optical scanning position optically scanned by the selected optical scanning path, thereby the n optical scanning positions are optically scanned with the light beams from one light source, the optical scanner comprising m (=1) light source that emits p (=2) light beams, a light beam splitting units 2, 2', 3, 3', 4, 5a, and 5b that form each light beam in a predetermined beam form while splitting each light beam from each light source into q (=2) light beams in a sub-scanning direction, a polygon mirror type optical deflector 7 that has a plurality of deflection reflection planes around a rotation axis and in which the number of light beams equal to (q·m·p=4) from the m light sources are incident to be deflected, n sets of scanning imaging optical systems 8a, 8b, 9a, 9b, 10a, and 10b that guide the n (=2) sets of light beams deflected by the polygon mirror type optical deflector to the corresponding optical scanning positions to form light spots, and an optical path selecting unit that selects the optical scanning path in each set for the n sets of light beams, wherein the polygon mirror type optical deflector 7 has the function of the optical path selecting unit.

In the polygon mirror type optical deflector 7, the polygon mirrors 7a and 7b having N (=4) deflection reflection planes are integrally formed in q (=2) stages in the direction of the rotation axis, and the deflection reflection planes of the polygon mirrors in each stage are shifted from each other by the predetermined angle θ (=45°) in the rotation direction. The polygon mirror type optical deflector 7 also has the function of the optical path selecting unit.

Each of the light beam splitting unit splits the light beam into q (=2) light beams with the semitransparent mirror 4a and the reflection plane 4b and has an aperture 12 that restricts the light beam width between the light sources 1 and 1' and the semitransparent mirror 4a corresponding to the light source. By providing the aperture between the light source and the semitransparent mirror, the aperture 12 can be commonly used by the four light beams, the number of components can be reduced, and the difference in light spot quality between the light beams that optically scan different photoconductors can be reduced.

In the example described in FIG. 5, the light intensity of each light beam is set according to the optical scanning position where the optical scanning is performed. In the embodiment, m=1, n=p=q=2, and the multi-beam scanning is performed on each of the two optical scanning positions (photoconductors 11a and 11b) with two light beams.

In this embodiment, only the semiconductor laser 1 can be used as the light source. In this case, m=p=1, n=q=2, and each of the two optical scanning positions (photoconductors 11a and 11b) are optically scanned with one light beam.

While the light beam splitting unit splits each light beam into two light beams with the semitransparent mirror 4a and the reflection plane 4b in the embodiment, other method may also be used for splitting the light beam.

Figure 6:
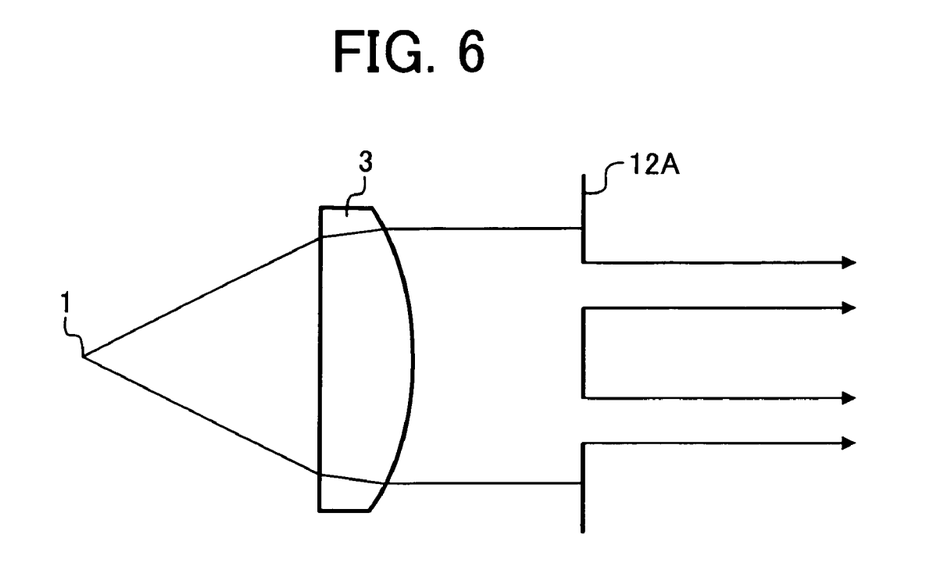
FIG. 6 is a view for explaining an example of a light beam split.

In an example shown in FIG. 6, a light beam is emitted from the light source (semiconductor laser 1 is exemplified). The light beam is then coupled in the parallel luminous flux state by the coupling lens 3, and is split into q (=2) in the sub-scanning direction by passing through an aperture 12A having q openings in the sub-scanning direction. When this method, the light beam can be separated without using the half mirror prism 4 and the aperture 12A can be also used for the beam profiling, thereby reducing the number of components. As a result, cost reduction and downsizing of the apparatus can be achieved.

Figure 7:
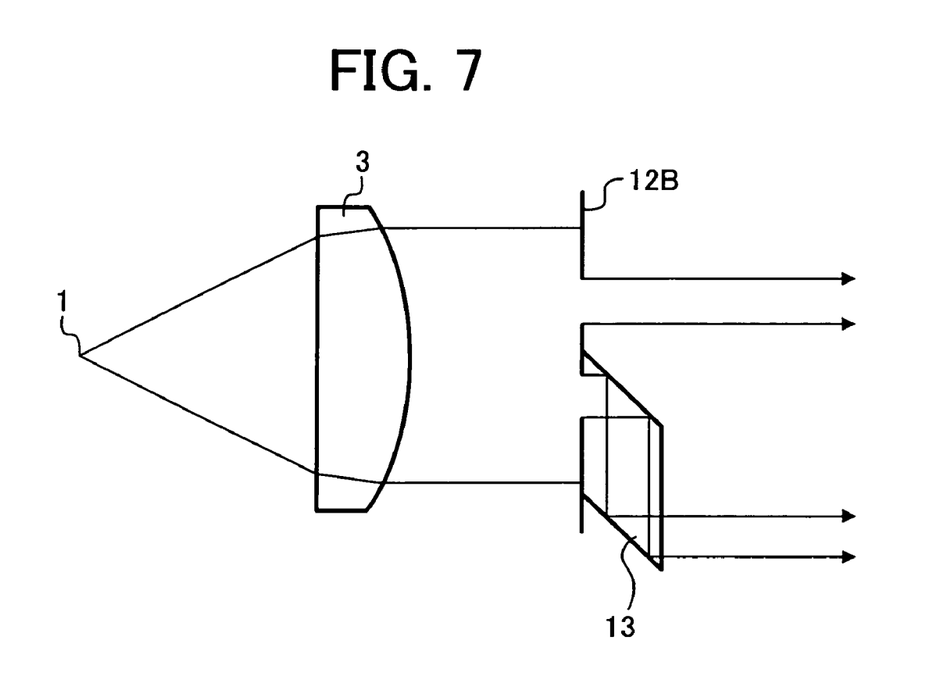
FIG. 7 is a view for explaining another example of a light beam split.

FIG. 7 is a modification of FIG. 6. In FIG. 7, the light beam that is coupled in the parallel luminous flux state by the coupling lens 3 is split into q (=2) in the sub-scanning direction by passing through an aperture 12B having q openings in the sub-scanning direction, and the light beam that has passed through one of the openings is shifted toward the sub-scanning (vertical direction of the drawing) by a prism 13. The two beams can be easily separated by a necessary distance by shifting one of light beams toward the sub-scanning direction with the prism 13.

In this example, since the distance between the two openings in an aperture 12B can be made narrower as compared with the aperture 12A of FIG. 6, the portion where the light intensity is large around the center of the light beam that has passed through the coupling lens 3 can be split into two light beams. Therefore, when compared with the example of FIG. 6, the light volume of the light beam used for the optical scanning can be more easily secured and a diameter of the spot can be further reduced.

Figure 8A:
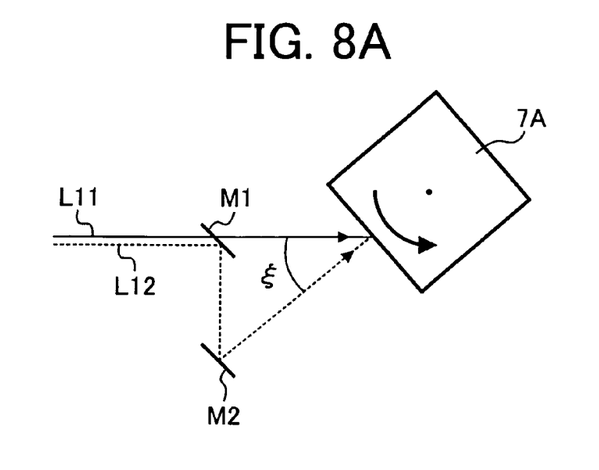
FIG. 8A is a view for explaining light incidence of a polygon mirror type optical deflector.
Figure 8B:
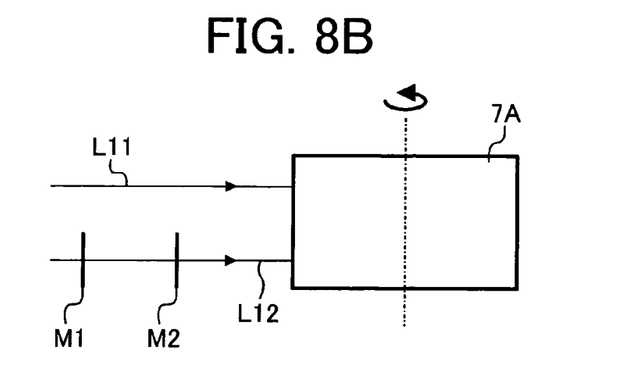
FIG. 8B is a view for explaining light incidence of the polygon mirror type optical deflector.
Figure 8C:
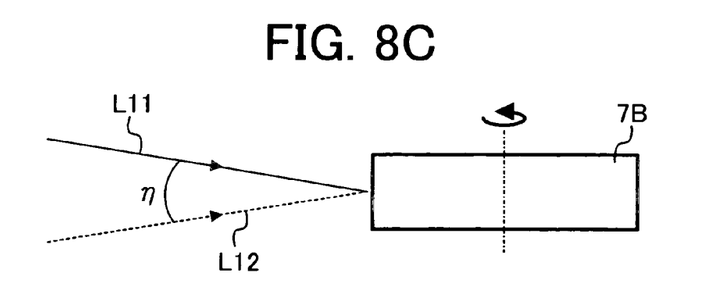
FIG. 8C is a view for explaining light incidence of the polygon mirror type optical deflector.

FIGS. 8A, 8B, and 8C depict only the characteristic portion of a modification of the embodiment shown in FIG. 1. In the embodiment shown in FIG. 1, the polygon mirror type optical deflector 7 is one in which the upper polygon mirror 7a and the lower polygon mirror 7b are integrally formed in two stages in the direction of the rotation axis, and the deflection reflection plane of the upper polygon mirror 7a and the lower polygon mirror 7b are shifted in the rotation direction.

In the modification in which the characteristic portion is shown in FIGS. 8A and 8B, a polygon mirror type optical deflector 7A has four deflection planes, and a size in the direction of the rotation axis of the deflection reflection plane is the degree to which the light beam separated in the sub-scanning direction can be entered. For simplicity of the explanation, it is assumed that the light source emits a single light beam that is split into two light beams in the sub-scanning direction by a light beam splitting unit (not shown), and it is also assumed that each split light beam is imaged as a long line image in the main scanning direction near the deflection reflection plane of the polygon mirror type optical deflector 7A by an individual cylindrical lens (not shown).

Similarly to FIG. 2, the two light beams obtained by the split of the light beam with the light beam splitting unit are represented by reference signs L11 and L12. The split of the light beam may be performed by the method shown in FIG. 2, or by the method shown in FIG. 6 or FIG. 7.

As shown in FIGS. 8A and 8B, the light beams L11 and L12 are parallel to each other in the sub-scanning direction. However, as shown in FIG. 8A, the optical path of the light beam L12 is curved by mirrors M1 and M2 when viewed from the direction of the rotation axis of the polygon mirror type optical deflector 7A. In the state that the light beams L11 and L12 enter the deflection reflection plane of the polygon mirror type optical deflector 7A, when the luminous fluxes are projected to the plane orthogonal to the rotation axis, as shown in FIG. 8A, there is a difference between the light beams by an angle $\xi$. For example, when the angle $\xi$ is set to 45°, the deflections of the light beams L11 and L12 by the polygon mirror type optical deflector 7A become equal to the deflections of the light beams L11 and L12 by the polygon mirror type optical deflector 7 shown in FIG. 1.

However, in the case of FIGS. 8A and 8B, unlike the case of FIG. 1, since the light beams L11 and L12 are different from each other in the optical path from the light source to the polygon mirror type optical deflector 7A, in the cylindrical lens that images the light beam as the long line image in the main scanning direction near a deflection reflection plane of a polygon mirror type optical deflector 7, it is necessary that a focal distance and/or the arrangement of the cylindrical lens for the light beam L11 and for the light beam L12 to be made different from each other.

Namely, in the embodiment in which its characteristic portion is shown in FIGS. 8A and 8B, the polygon mirror type optical deflector 7A is the polygon mirror having N (=4) deflection reflection planes. The directions of the n (=2) sets of light beams L11 and L12 entering the deflection reflection plane of the polygon mirror type optical deflector 7A from the light source side are set so as to mutually form the angle $\xi$ when viewed from the direction of the rotation axis of the polygon mirror type optical deflector 7A. The optical path selecting unit is formed by the setting of the polygon mirror type optical deflector 7A and the incident directions of the n sets of light beams L11 and L12 (specifically, an arrangement of the mirrors M1 and M2).

FIG. 8C is a modification of FIGS. 8A and 8B. In the projection of the light beams L11 and L12 to the plane orthogonal to the rotation axis of a polygon mirror type optical deflector 7B (having four deflection reflection planes), similarly to FIG. 8A, the light beams L11 and L12 have the angle $\xi$, and the light beams L11 and L12 form the angle $\eta$ as shown in FIG. 8 when viewed from the direction orthogonal to the rotation axis. When the angle $\eta$ is given between the light beams L11 and L12 when viewed from the direction orthogonal to the rotation axis, the size in the direction of the rotation axis of the polygon mirror type optical deflector 7B can be reduced when compared with the polygon mirror type optical deflector 7A.

Although the number N of deflection reflection planes of the polygon mirror type optical deflector is set to 4 in the above descriptions, needless to say, it is also possible to use the polygon mirror type optical deflector having the deflection reflection planes of N=2, N=3, or equal to or more than 5. The polygon mirror type optical deflector, in which the polygon mirrors having equal to or more than five deflection reflection planes are integrally stacked in two stages in a direction of the rotation axis and the deflection reflection planes of the polygon mirrors are shifted from each other in a rotation direction, is described in Japanese Patent Application Laid-Open No. 2001-83452.

Figure 9:
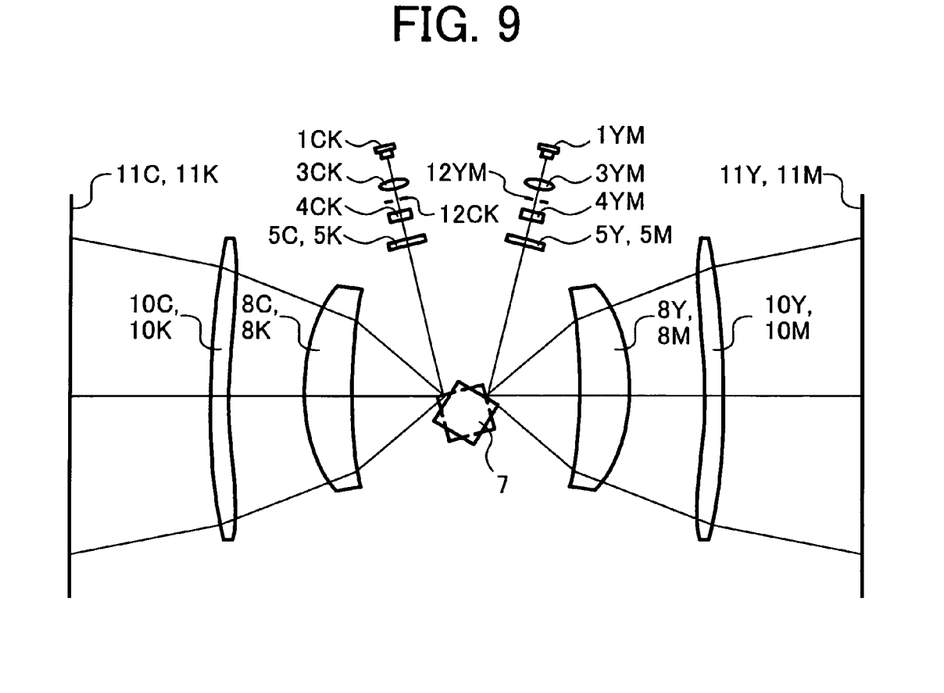
FIG. 9 a view for explaining one embodiment of the optical scanner.
Figure 10:
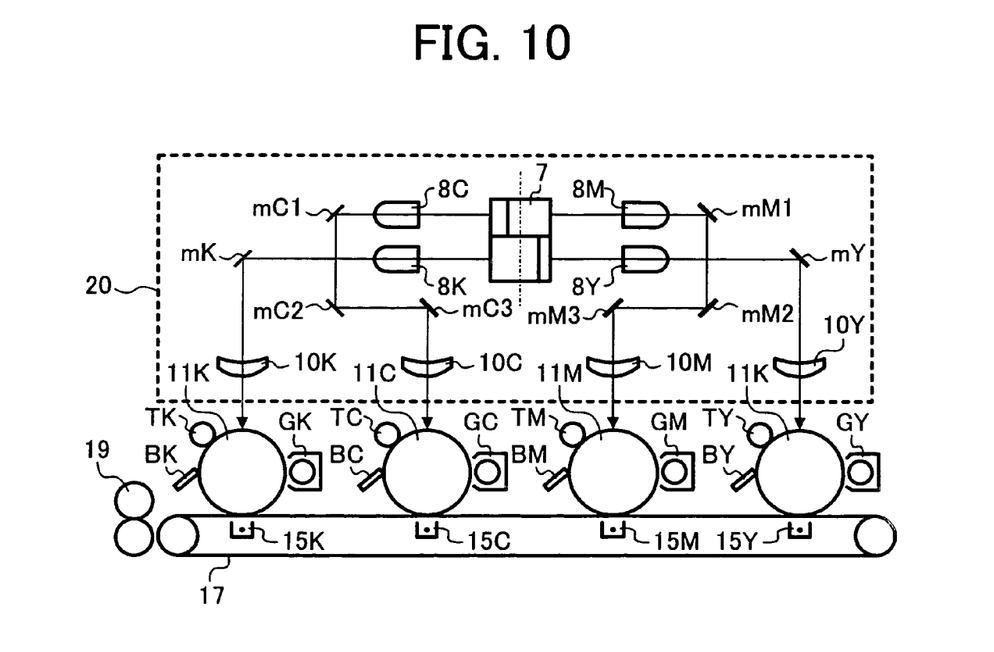
FIG. 10 is a view for explaining one embodiment of an image forming apparatus using the optical scanner of FIG. 9.

With reference to FIGS. 9 and 10, an embodiment with respect to an image forming apparatus to which the optical scanner in the above embodiment is applied will be explained.

FIG. 9 depicts an optical portion of the optical scanner when viewed from the sub-scanning direction, i.e. the direction of the rotation axis of the polygon mirror type optical deflector 7. For simplicity of the explanation, the mirrors for folding the optical path from the polygon mirror type optical deflector 7 to the optical scanning position are omitted, and the optical path is drawn to be straight.

In the optical scanner shown in FIG. 9, m=q=2, p=1, and n=4, and the four optical scanning positions are optically scanned with one light beam. The photoconductors 11Y, 11M, 11C, and 11K are arranged in each optical scanning position, and the electrostatic latent images formed on the four photoconductors are individually visualized by magenta toner, yellow toner, cyan toner, and black toner to form the color image.

In FIG. 9, reference signs 1YM and 1CK represent the semiconductor laser. The semiconductor lasers 1YM and 1CK emit one light beams. The semiconductor laser 1YM is alternately intensity-modulated by the image signal corresponding to a yellow image and the image signal corresponding to a magenta image. The semiconductor laser 1CK is alternately intensity-modulated by the image signal corresponding to a cyan image and the image signal corresponding to a black image.

The light beam emitted from the semiconductor laser 1YM is formed in the parallel luminous flux by a coupling lens 3YM and beam-shaped by passing through an aperture 12YM, the light beam to enter a half mirror prism 4YM and split into two light beams in the sub-scanning direction. The half mirror prism 4YM is similar to the half mirror prism 4 explained with reference to FIG. 2. One of the two split light beams is used for the write of the yellow image, and the other light beam is used for the write of the magenta image.

The two light beams split in the sub-scanning direction are focused in the sub-scanning direction by cylindrical lenses 5Y and 5M (arranged to overlap each other in the sub-scanning direction) to enter the polygon mirror type optical deflector 7. The polygon mirror type optical deflector 7 is similar to the polygon mirror type optical deflector explained with reference to FIGS. 1 and 3, the polygon mirrors having the four deflection reflection planes are integrally formed in two stages in the direction of the rotation axis, and the deflection reflection planes of the polygon mirrors are shifted from each other in the rotation direction. The long line image in the main scanning direction by the cylindrical lenses 5Y and 5M is imaged near the deflection reflection plane position of each polygon mirror.

The light beams deflected by the polygon mirror type optical deflector 7 are transmitted through first scanning lenses 8Y and 8M and second scanning lenses 10Y and 10M respectively, and the light beams form the light spots on optical scanning positions 11Y and 11M by the operation of the lenses and optically scan the optical scanning position.

Similarly, the light beam emitted from the semiconductor laser 1 CK is formed in the parallel luminous flux by a coupling lens 3CK and beam-shaped by passing through an aperture 12CK. The light beam then enters a half mirror prism 4CK and split into two light beams in the sub-scanning direction. The half mirror prism 4CK is similar to the half mirror prism 4YM. One of the two split light beams is used for the write of the cyan image, and the other light beam is used for the write of the black image.

The two light beams split in the sub-scanning direction are focused in the sub-scanning direction by cylindrical lenses 5C and 5K (arranged to overlap each other in the sub-scanning direction) to be incident to the polygon mirror type optical deflector 7. The light beams deflected by the polygon mirror type optical deflector 7 are transmitted through first scanning lenses 8C and 8K and second scanning lenses 10C and 10K, respectively, and the light beams form the light spots on optical scanning positions 11C and 11K by the operation of the lenses and optically scan the optical scanning position.

The portion represented by a reference sign 20 in FIG. 10 is the optical scanner, and it is the unit described in of FIG. 9. As shown in FIG. 10, one of the light beams deflected by the upper polygon mirror of polygon mirror type optical deflector 7 is guided to the optical scanning position of the photoconductor 11M by the optical path curved with optical path folding mirrors mM1, mM2, and mM3, and the other light beam is guided to the optical scanning position of the photoconductor 11C by the optical path curved with optical path folding mirrors mC1, mC2, and mC3.

One of the light beams deflected by the lower polygon mirror of polygon mirror type optical deflector 7 is guided to the optical scanning position of the photoconductor 11Y by the optical path curved with an optical path folding mirrors mY, and the other light beam is guided to the optical scanning position of the photoconductor 11K by the optical path curved with an optical path folding mirrors mK.

Accordingly, the light beams from the m (=2) semiconductor lasers 1YM and 1CK are split into four light beams by half mirror prisms 4YM and 4CK, and the four photoconductors 11Y, 11M, 11C, and 11K are optically scanned with the four light beams. The photoconductors 11Y and 11M are alternately scanned optically with the light beams into which the light beam from the semiconductor laser 1YM is split while the polygon mirror type optical deflector 7 is rotated. The photoconductors 11C and 11K are alternately scanned optically with the light beams into which the light beam from the semiconductor laser 1CK is split while the polygon mirror type optical deflector 7 is rotated.

Each of the photoconductors 11Y, 11M, 11C, and 11K is uniformly rotated clockwise to be uniformly charged by charging rollers TY, TM, TC, and TK that are of a charging unit. Each of the yellow, the magenta, the cyan, and the black color images is written in the photoconductors 11Y, 11M, 11C, and 11K by the optical scanning on the corresponding light beam to form the corresponding electrostatic latent image (negative latent image).

The electrostatic latent images are reversely developed by development devices GY, GM, GC, and GK to form the yellow, magenta, cyan, and black toner images on the photoconductors 11Y, 11M, 11C, and 11K.

The toner images are transferred to a transfer sheet (not shown). The transfer sheet is conveyed by a conveying belt 17. The yellow toner image is transferred from the photoconductor 11Y to the transfer sheet by a transfer device 15Y, and the magenta, the cyan, and the black toner images are sequentially transferred from the photoconductors 11M, 11C, and 11K to the transfer sheet by transfer devices 15M, 15C, and 15K, respectively.

Thus, the yellow, the magenta, the cyan, and the black toner images overlap each other on the transfer sheet to synthetically form a color image. The color image is fixed onto the transfer sheet by a fixing device 19 to obtain color images.

The embodiment shown in FIGS. 9 and 10 is a tandem type image forming apparatus in which the electrostatic latent images are individually formed by the optical scanning on the plurality of photoconductors, the electrostatic latent images are visualized to form toner images, and the toner images are transferred to a same sheet-like recording medium to synthetically perform image formation, wherein the number of photoconductors is four, two light sources 1YM and 1CK are used, the optical scanner is formed so that each two photoconductors are optically scanned with light beams from each light source, and the electrostatic latent images formed on the four photoconductors 11M, 11Y, 11C, and 11K are individually visualized with the magenta toner, yellow toner, cyan toner, and black toner to form a color image.

While in the embodiment of the image forming apparatus, the optical scanning on each photoconductor is performed by a single beam method, it is also possible that each light source side is formed as shown in FIG. 1, and the optical scanning on the photoconductor is performed by a multi-beam method.

As described above, according to the optical scanner and the image forming apparatus of the embodiments, the polygon mirror type optical deflector constitutes at least a part of the optical path selecting unit, and the polygon mirror type optical deflector has a plurality of deflection reflection planes. Accordingly, at least four optical scanning can be performed per one rotation of the polygon mirror type optical deflector, and the optical scanning speed can be increased for n optical scanning positions although the number m of light sources is smaller than the number n of optical scanning positions.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner configured to optically scan n optical scanning objects with a light beam from a light source by forming optical scanning paths from the light source to the n optical scanning objects, where n≧2, sequentially selecting the optical scanning paths at different timings, and performing intensity modulation of the light beam from the light source with image signals corresponding to the optical scanning objects optically scanned via the optical scanning path selected, the optical scanner comprising:

m light sources configured to emit p light beams, where 1≦m≦n and p≧1;

a light beam splitting unit configured to split each of the light beams from each of the light sources into q light beams in a sub-scanning direction and to form each of the light beams into a predetermined beam form, where 2≦q≦n;

a polygon mirror optical deflector including a plurality of deflection-reflection planes around a rotation axis and configured to deflect a number of light beams equal to (q·m·p) from the m light sources which are incident on the polygon mirror optical deflector;

n scanning imaging optical systems configured to guide n sets of light beams deflected by the polygon mirror optical deflector to corresponding optical scanning objects to form light spots; and an optical path selecting unit configured to select an optical scanning path for each of the n sets of light beams, wherein the polygon mirror optical deflector is at least a part of the optical path selecting unit.

2. The optical scanner according to claim 1, wherein the polygon mirror optical deflector comprises polygon mirrors each having N deflection reflection planes, the polygon mirrors being piled into q stages in a direction of the rotation axis, where N≧2, the deflection reflection planes of the polygon mirror of each stage are shifted from the deflection reflection planes of the polygon mirror of another stage by a predetermined angle in a rotation direction, and the polygon mirror optical deflector is configured to function as the optical path selecting unit.

3. The optical scanner according to claim 1, wherein the polygon mirror optical deflector comprises a polygon mirror having N deflection reflection planes, where N≧2, the polygon mirror optical deflector is configured such that incident directions of the n sets of light beams incident on the deflection reflection planes from the light source mutually form an angle when viewed from the direction of the rotation axis of the polygon mirror optical deflector, and the polygon mirror optical deflector functions as the optical path selecting unit.

4. The optical scanner according to claim 3, wherein the polygon mirror optical deflector is configured such that incident directions of the n sets of light beams incident on the deflection reflection planes from the light source mutually form an angle when viewed from a direction orthogonal to the direction of the rotation axis of the polygon mirror optical deflector.

5. The optical scanner according to claim 1, wherein the light beam splitting unit splits the light beam into the q light beams with a semitransparent mirror and a reflection plane.

6. The optical scanner according to claim 5, further comprising an aperture between each light source and the semitransparent mirror corresponding to the light source, the aperture being configured to restrict a light beam width.

7. The optical scanner according to claim 1, wherein each light beam from each light source passes through an aperture having q openings in the sub-scanning direction.

8. The optical scanner according to claim 1, wherein a light intensity of each light beam is set according to the optical scanning position at which optical scanning is performed.

9. The optical scanner according to claim 1, wherein m=1, n=p=q=2, and multi-beam scanning is performed on each of the two optical scanning positions with two light beams.

10. The optical scanner according to claim 1, wherein m=p=1, n=q=2, and each of the two optical scanning positions is optically scanned with one light beam.

11. The optical scanner according to claim 1, wherein m=q=2, p=2, n=4, and multi-beam scanning is performed on each of the four optical scanning positions with two light beams.

12. The optical scanner according to claim 1, wherein
m=q=2,
p=1,
n=4, and
each of the four optical scanning positions is optically scanned with one light beam.

13. A tandem image forming apparatus in which optical scanning is performed on n photoconductors with an optical scanner to individually form electrostatic latent images, the electrostatic latent images are visualized to form toner images, and the toner images are transferred onto a same sheet recording medium to synthetically perform image formation, wherein the optical scanner is configured to optically scan with a light beam from a light source by forming optical scanning paths from the light source to the n photoconductors, where n≧2, sequentially selecting the optical scanning paths at different timings, and performing intensity modulation of the light beam from the light source with image signals corresponding to the photoconductors optically scanned via the optical scanning path selected, the optical scanner comprising:

m light sources configured to emit p light beams, where 1≦m<n and p≧1;

a light beam splitting unit configured to split each of the light beams from each of the light sources into q light beams in a sub-scanning direction and to form each of the light beams into a predetermined beam form, where 2≦q≦n;

a polygon mirror optical deflector including a plurality of deflection-reflection planes around a rotation axis and configured to deflect a number of light beams equal to (q·m·p) from the m light sources which are incident on the polygon mirror optical deflector;

n scanning imaging optical systems configured to guide n sets of light beams deflected by the polygon mirror optical deflector to corresponding photoconductors to form light spots; and an optical path selecting unit configured to select an optical scanning path for each of the n sets of light beams, wherein the polygon mirror optical deflector is at least a part of the optical path selecting unit.

14. The image forming apparatus according to claim 13, wherein n=four and m=two so that each of the photoconductors is optically scanned with light beams from each of the light sources, and the electrostatic latent images formed on the four photoconductors are individually visualized with magenta toner, yellow toner, cyan toner, and black toner to form a color image.

* * * * *